US009747193B1

(12) United States Patent
Reiss

(10) Patent No.: US 9,747,193 B1
(45) Date of Patent: Aug. 29, 2017

(54) SYSTEM AND METHOD FOR AUTOMATIC ROOT CAUSE DETECTION

(71) Applicant: CA, Inc., Islandia, NY (US)

(72) Inventor: Andreas Reiss, Frankfurt (DE)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 13/800,576

(22) Filed: Mar. 13, 2013

(51) Int. Cl.
*G06F 9/44* (2006.01)
*G06F 11/36* (2006.01)

(52) U.S. Cl.
CPC ............ *G06F 11/3668* (2013.01); *G06F 9/44* (2013.01); *G06F 11/3612* (2013.01); *G06F 11/3636* (2013.01)

(58) Field of Classification Search
CPC ............ G06F 11/3612; G06F 11/3636; G06F 11/3668; G06F 9/44
See application file for complete search history.

(56) References Cited

U.S. PATENT DOCUMENTS

| 7,200,588 | B1 * | 4/2007 | Srivastava | G06F 11/3636 |
| 7,433,852 | B1 * | 10/2008 | Bertrand | G06F 9/4446 434/118 |
| 7,475,387 | B2 * | 1/2009 | Chandane | 717/128 |
| 8,181,161 | B2 * | 5/2012 | Kollmann et al. | 717/128 |
| 8,473,922 | B2 * | 6/2013 | Li et al. | 717/130 |
| 8,819,645 | B2 * | 8/2014 | Kerizac et al. | 717/133 |
| 8,898,636 | B1 * | 11/2014 | Pomerantz | G06F 9/45504 717/124 |
| 8,997,048 | B1 * | 3/2015 | Pomerantz | G06F 11/3636 717/124 |
| 9,015,194 | B2 * | 4/2015 | Ziv | G06F 17/30705 707/778 |
| 2003/0056199 | A1 * | 3/2003 | Li et al. | 717/127 |
| 2003/0056200 | A1 * | 3/2003 | Li | G06F 11/3612 717/128 |
| 2006/0150163 | A1 * | 7/2006 | Chandane | G06F 11/3612 717/131 |

(Continued)

OTHER PUBLICATIONS

Peter Garraghan et al., "An Empirical Failure-Analysis of a Large-Scale Cloud Computing Environment", [Online], IEEE 2014, pp. 113-120, [Retrieved from Internet on Apr. 3, 2017], <http://ieeexplore.ieee.org/stamp/stamp.jsp?arnumber=6754595>.*

(Continued)

*Primary Examiner* — Ziaul A Chowdhury
(74) *Attorney, Agent, or Firm* — Pillsbury Winthrop Shaw Pittman LLP

(57) ABSTRACT

A system, method, and computer-readable storage medium are provided to automatically detect a root cause for an error that occurred during execution of functionality in a system. When a request is executed, a log associated with the execution of the request may be stored at the storage. The log may include information associated with a component associated with the execution of the request. Logs related to the same type of request may be compared with the executed request. Specifically, information associated with a component of the executed request may be compared with information associated with a component of the identified stored requests. When information associated with a component of the executed request does not match information associated with a component of the identified stored requests, a root cause for an error is associated with the associated component of the executed request.

24 Claims, 3 Drawing Sheets

(56) References Cited

U.S. PATENT DOCUMENTS

| | | | | |
|---|---|---|---|---|
| 2007/0250820 | A1* | 10/2007 | Edwards | G06F 11/3636 |
| | | | | 717/131 |
| 2008/0065400 | A1* | 3/2008 | Bhargava | G06F 11/3612 |
| | | | | 705/7.26 |
| 2008/0109796 | A1* | 5/2008 | Kosche | G06F 11/3612 |
| | | | | 717/158 |
| 2009/0044053 | A1* | 2/2009 | Chandane | 714/25 |
| 2009/0235284 | A1* | 9/2009 | Steventon | G06F 8/65 |
| | | | | 719/328 |
| 2010/0100774 | A1* | 4/2010 | Ding et al. | 714/45 |
| 2012/0054727 | A1* | 3/2012 | Joukov | G06F 9/44505 |
| | | | | 717/168 |
| 2013/0042224 | A1* | 2/2013 | Kerizac et al. | 717/135 |
| 2017/0075792 | A1* | 3/2017 | Udvuleanu | G06F 11/3668 |

OTHER PUBLICATIONS

Thomas Reidemeister et al., "Learning to Self-Recover", [Online], IEEE 2011, pp. 1066-1069, [Retrieved from Internet on Apr. 3, 2017], <http://ieeexplore.ieee.org/stamp/stamp.jsp?arnumber=5990506>.*

Chun Yuan et al., "Automated Known Problem Diagnosis with Event Traces", [Online], ACM 2006, pp. 375-388, [Retrieved from Internet on Apr. 3, 2017], <https://www.microsoft.com/en-us/research/wp-content/uploads/2016/02/eurosys-p375-yuan.pdf>.*

Thomas Reidemeister et al., "Diagnosis of Recurrent Faults using Log Files", [Online], ACM 2009, pp. 12-23, [Retrieved from Internet on Apr. 3, 2017], <http://delivery.acm.org/10.1145/1730000/1723031/p12-reidemeister.pdf>.*

\* cited by examiner

SYSTEM AND METHOD FOR AUTOMATIC ROOT CAUSE DETECTION

BACKGROUND

The present disclosure relates to application performance management, and more specifically to determining a root cause of an error that occurs during execution of functionality in a system Application performance management generally focuses on monitoring and managing the non-functional requirements of software engineering of software applications.

BRIEF SUMMARY

One aspect of the disclosure relates to automatically determining a root cause for an error that occurred during execution of functionality in a system. According to one aspect of the present disclosure, there is provided a system to determine a root cause of an error that occurred in an application, the system comprising: a monitoring module configured to monitor execution of a first request involving the application; and an error identification module configured to: identify a log from a collection of logs as an identified log, each log of the collection of logs having information associated with a component of another request; compare information associated with a first component of the first request with information associated with a component of the identified log; and responsive to a determination that the information associated with the first component of the first request does not match information associated with the component of the identified log, determine that the root cause of the error is associated with the first component of the first request.

According to one aspect of the present disclosure, there is provided a method for automatically determining a root cause for an error that occurred in an application, the method being implemented on a computer system comprising a physical processor, the method comprising: monitoring execution of a first request involving the application; identifying a log from a collection of logs as an identified log, each log of the collection of logs having information associated with a component of another request; comparing information associated with a first component of the first request with information associated with a component of the identified log; and responsive to a determination that the information associated with the first component of the first request does not match information associated with the component of the identified log, determining that the root cause of the error is associated with the first component of the first request.

According to one aspect of the present disclosure, there is provided a computer program product comprising: a non-transitory computer readable storage medium storing information related automatically detecting a root cause for an error that occurred in an application, the stored information comprising: instructions configured to cause a computing device to: monitor execution of a first request involving the application; identify a log from a collection of logs as an identified log, each log of the collection of logs having information associated with a component of another request; compare information associated with a first component of the first request with information associated with a component of the identified log; and responsive to a determination that the information associated with the first component of the first request does not match information associated with the component of the identified log, determine that the root cause of the error is associated with the first component of the first request.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification.

BRIEF DESCRIPTION OF THE DRAWINGS

Aspects of the present disclosure are illustrated by way of example and are not limited by the accompanying figures, with like references indicating like elements.

DETAILED DESCRIPTION

Figure 1:
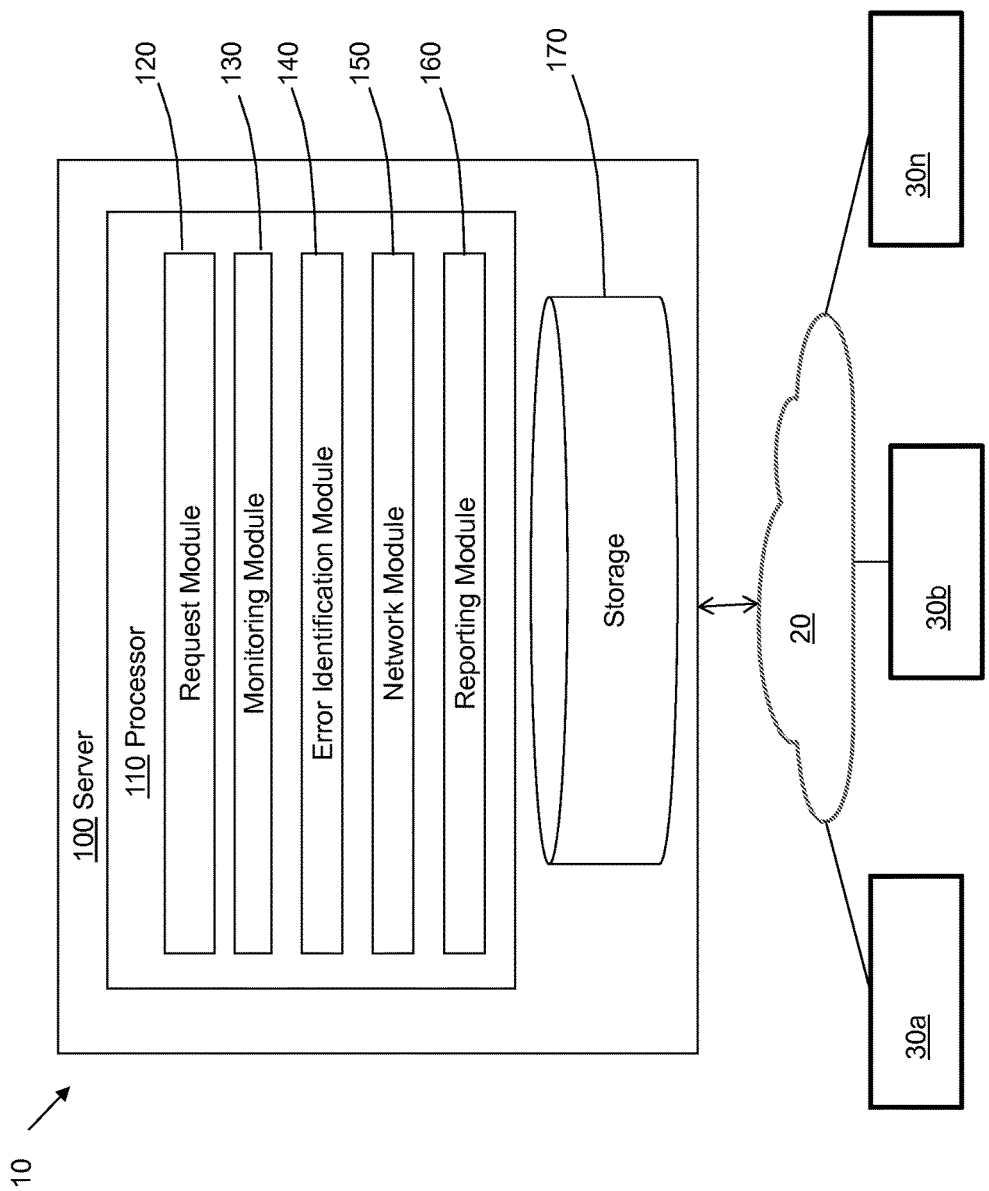
FIG. 1 illustrates a system configured to automatically detect a root cause for an error that occurred in an application, according to various implementations.

FIG. 1 illustrates a diagram of a system 10 for automatically detecting a root cause for an error that occurred in an application, according to an implementation of the invention. The system 10 may include a network 20 and a computing device 100. The computing device 100 may include a processor 110 configured to perform some or all of a functionality of a plurality of modules. In some implementations, the computing device 100 may comprise a non-transitory, tangible computer-readable storage medium with an executable program stored thereon, wherein the program instructs a microprocessor to perform some or all of the functionality of the plurality of modules. The plurality of modules may include, for example, a request module 120, a monitoring module 130, an error identification module 140, a network module 150, a reporting module 160, and/or other modules. In some implementations, the computing device 100 may comprise a storage 170. The storage 170 may comprise a collection of requests, a collection of components, a collection of logs, and/or other information.

A request may comprise a set of instructions for executing functionality via computing device 100, where the set of instructions access a set of components. Types of requests include, for example, a transaction, an application call, a command to execute a program, a system call, and/or other type of access of functionality available via the computing device 100. An instruction may comprise an individual command and/or a set of commands, where an individual command may include a request parameter, a type of value associated with the request parameter, functionality associated with the request parameter, and/or other instruction attributes. A component may comprise a set of functions and/or data accessed by a request. In some implementations, a component may be associated with an instruction of the request. A component may be a modular object that is encapsulated from other components in the request. For example, a component may comprise an associated set of request parameters, an ability to provide predetermined functionality associated with the component, an associated set of types of values related to the respective set of request parameters, and/or other attributes.

A request may be associated with a plurality of sequential components. Some or all of the components of a request may be concurrently and/or serially accessed during execution of the request.

In some examples, an individual component may be associated with a software component, a web service, a functional part of a web service, a module, a session, a resource, an application boundary, and/or other object that provides functionality and/or data. Application boundaries may comprise entry points, exit points, and/or other information related to accessing and/or exiting an application. An application entry point may comprise, for example, a web container, a Servlet, a Queue Listener, a message receiver, and/or other application entry point. An application exit point may comprise, for example, an HTTP Sender, a queue writer, a JDBC API, an API to access a mainframe, and/or other application exit points. A component may comprise other components. For example, a component may comprise a set of sub-components. Sub-components may have the same or similar attributes as a component. In some implementations, various components and/or sub-components may interact with each other via interfaces, via a thread managing data accesses to and from components, via stack management of an execution of a request, and/or by other methods.

A request may be initiated via, for example, user input, automated system functionality, functionality of another application running on computing device 100, an application running on another device (e.g., devices 30a, . . . 30n, a device external to system 10, and/or another device) able to access computing device 100, and/or by other methods. Information associated with a request may comprise, for example, a request path comprising a sequence of components accessed by the request, application boundaries, meta information, application controller instances, instructions associated with the request, any combination thereof, and/or other request components.

The request path may comprise a sequential ordering of a set of components accessed by the request. The components may be concurrently or serially accessed. Some of the components may be part of a first application, while some components may be part of another application (e.g., a second application, a third application, and/or another application). The components may be associated with request parameters that detail specific types of values input and output from the respective components.

Meta information may comprise information related to the request including, for example, request parameters (e.g., types of data associated with the request, types of data input into the request, types of data produced during and/or as a result of the request, types of data output from the request, and/or other types of data related to the request), message properties, request name, thread name, thread group, and/or other meta information.

Application controller instance information may comprise, for example, http requests, servlets, strut actions, and/or other information related to an application controller instance.

In some implementations, storage 170 stores available applications, network connections, requests, instructions for requests, request paths, locations to entry points for requests, components associated with requests, request parameters associated with components, locations for entry points to applications, components associated with applications, and/or other information related to the system 10.

As mentioned above, storage 170 may also store a collection of requests, a collection of components associated with the respective requests, and a collection of logs associated with the respective requests.

The collection of requests may include information relating to a plurality of requests. In some implementations, the collection of requests may store information related to every request that has been executed via system 10. In some implementations, the collection of requests may store information related to some or all possible requests that could be implemented via system 10. In some implementations, the information relating to a request may comprise one or more of: a request identifier, a set of instructions associated with the request, an entry point (e.g., an initial instruction of the request, an application first accessed in execution of the request, a component first accessed in execution of the request, and/or other initial access in execution of the request), an exit point (e.g., an application last accessed in execution of the request, a component last accessed in execution of the request, and/or other last access in execution of the request), a set of components associated with the request, information related to the components associated with the requests, a sequential ordering of the components associated with the request, a plurality of sets of request parameters associated with the respective components, a plurality of values associated with the respective request parameters, a set of applications associated with the request, a set of applications associated with the respective set of components, a number of components associated with the request, a number of applications associated with the request, a number of request parameters associated with the request, and/or other information relating to a request. The information associated with a component may comprise, for example, a number of request parameters associated with the component, a value type (e.g., string, integer, floating point, vector, etc.) of the respective request parameters, associated metrics (e.g., component identifier, resource name of component, user name, etc.), class name associated with component, method name associated with component, request parameters, exception details, http request parameters, query parameters, and/or other information relating to the component.

The components of a request may be identified by storage at system 10 (e.g., storage 170, other storages communicably coupled to system 10, etc.), via transaction tracing of the respective request (e.g., via a java agent or CLR profiler attached to the applications accessed by the request), by instrumentation of the applications accessed by the request, by a call stack associated with execution of the request, by information stored at a registry associated with the system 10, by application metadata, by application attributes, by request metadata, by request attributes, by user input, and/or in other ways. The sequential ordering of the components may be identified in a manner the same or similar to the identification of the components. The request parameters associated with the components and/or types of values associated with the request parameters may be identified in a manner the same or similar to the identification of the components.

The collection of components may include information relating to a plurality of components associated with respective requests. The collection of components may store information related to the components and information related to request parameters associated with the components. A plurality of request parameters may be associated with the component. Types of request parameters may include, for example, http request parameters, query parameters, application parameters, user parameters, and/or other types of request parameters. Information associated with a request parameter may comprise, for example, an instruction and/or functionality related to the request parameter, a type of request parameter, a number of values associated with the request parameter, a length of a request parameter, value type (e.g., string, integer, floating point, vector, etc.) of the request parameter, exceptions associated with the request parameter, whether the request parameter is an input parameter of the component, whether the request parameter is an output parameter of the component, and/or other information relating to the request parameter.

The collection of logs comprises a plurality of logs associated with the respective execution of some or all requests executed via system 10. In some implementations, the collection of logs comprises a plurality of logs related to the execution of all of the requests executed via system 10. An individual log may be associated with an execution of an individual request. An individual log may comprise one or more of: the information associated with the respective request (e.g., the information related to a request as described above), information associated with components of the request, a threshold of acceptable values associated with the request parameters of the components of the request, a number of concurrent invocations of the request, a response time of the entire request, a plurality of response times associated with the respective plurality of components associated with the request, a time of day of request, and/or other information related to the execution of the request.

In some implementations, the collection of logs may comprise a plurality of logs related to execution of a same request at different times. In some implementations, for an individual request, the collection of logs may include a predetermined number of logs. The predetermined number may be set by an administrator of system 10, by a user, may be a percentage of the number of types of requests, may be a percentage of the number of possible requests, and/or may be set in other ways. In some examples, the predetermined number of logs is 5, 10, and/or another predetermined number of logs. In some implementations, the first predetermined number of logs associated with the individual request may be stored as the logs associated with the individual request in the collection of logs. Threshold values for the request parameters associated with the components of the request may be determined based on the values for the respective request parameters of the respective components of the stored logs. In some implementations, threshold values associated with a request parameter of a component of the individual request may be updated when an executed request is compared to stored logs for the same request.

Figure 2:
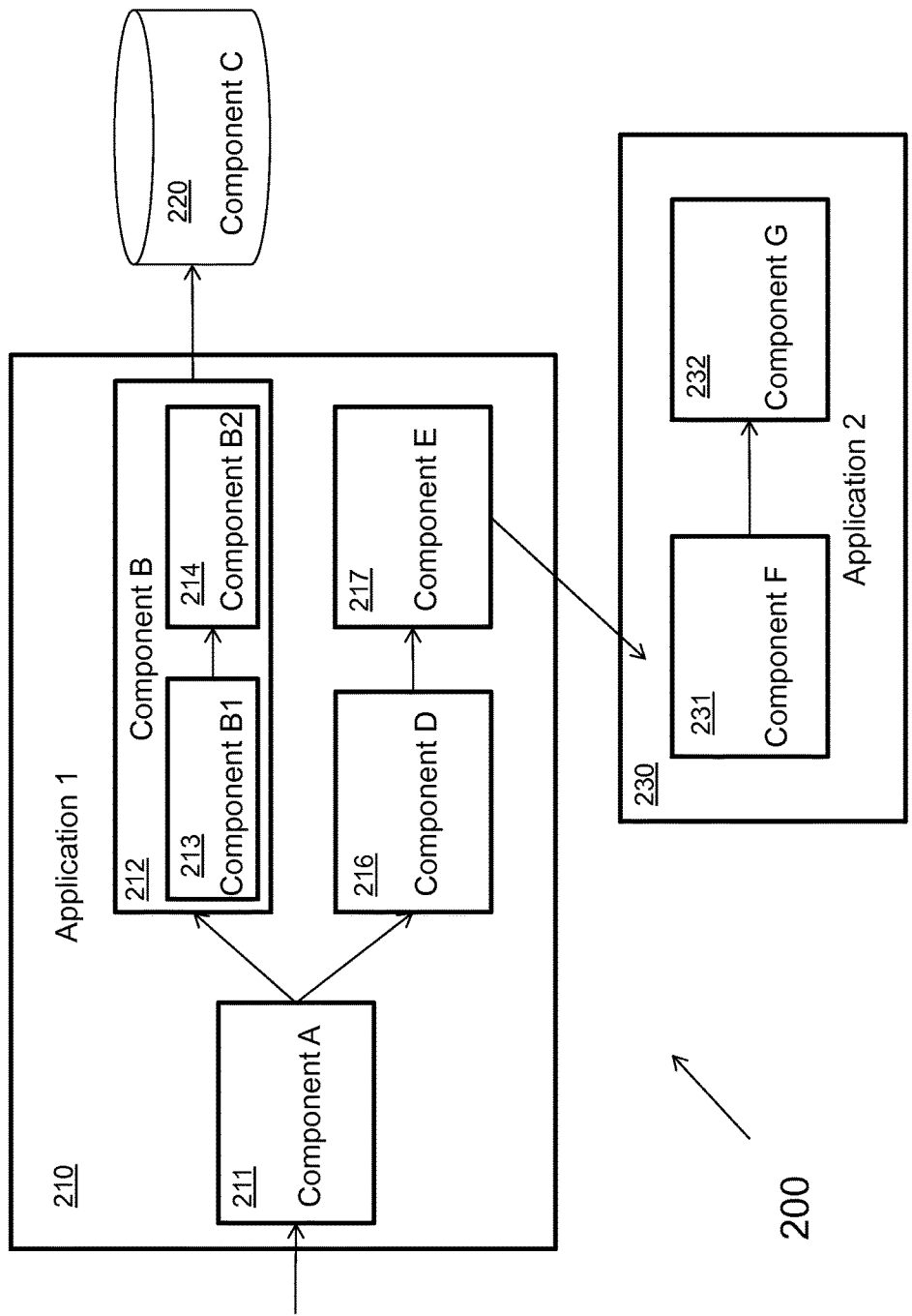
FIG. 2 illustrates an execution of a request, according to various implementations.

The request module 120 may be configured to execute a request. FIG. 2 illustrates execution of a request 200. Execution of request 200 may comprise access of an entry point (e.g., at component A 211), concurrent access of component B 212 (with sub-components B1 213 and B2 214) and components D 216 and E 217, access of component C 220, access of component F 231, and access of component G 232. In some examples, each of the components and sub-components may have request parameters associated therewith. In some examples, component A 211 may be a servlet module of Application 1 210 accessed as a result of a command entered via system 10. Request parameters associated with component A 211 may include, for example, URL, server name, user name, activepage, membership status, and/or other request parameters. Values associated with the respective request parameters may comprise, for example, http://hello.world/com/showit.jsp; MyTestServer, FirstLastName, Welcome, 5, and/or other values.

Request module 120 may be configured to access Components B 212 and D 216 after access of Component A 211. For example, request module 120 may be configured to access Components B 212 and D 216 based on a sequential ordering of components to be accessed stored in relation to the request to be executed. In some implementations, request module 120 may obtain information related to the request when facilitating execution of the request. Component B 212 may be related to loading a user profile of Application 1 210 and may comprise component B1 213, which may be a Session Bean, and component B2 214, which may be a Web Service Layer. For example, component B1 212 may comprise a first session bean of Application 1. Request parameters associated with Component B1 212 may comprise, for example, method, user, membership status, area, and/or other request parameters. Values associated with the respective request parameters may comprise, for example, loadUserProfile, FirstLastName, 5, external, and/or other values. Component B2 212 may comprise a DAO of Application 1 210. Request parameters associated with Component B2 212 may comprise, for example, search, user, membership status, expiry, and/or other request parameters. Values associated with the respective request parameters may include, for example, loadUserProfileExternal, FirstLastName, 5, a time period (e.g., 7 hours), and/or other values.

After access of component B (and sub-components B1 and B2), request module 120 may be configured to access component C 220. Component C 220 may comprise a database. Request parameters associated with Component C 220 may comprise, for example, SQL statement, SQL parameter 1, SQL parameter 2, connection string, execution method, and/or other request parameters. Values associated with the respective request parameters may include, for example, Select*From Customer Where $1 equals $2, Name, Smith, username/password@myserver/myservice: dedicated/instancename, ExecuteUpdate and/or other values.

Component D 216 may comprise a second Session Bean of Application 1 210. Request parameters associated with Component D 216 may comprise, for example, method, account number, employee, and/or other request parameters. Values associated with the respective request parameters may include, for example, chargeAccount, 1234567, true, and/or other values.

After access of component D 216, request module 120 may be configured to access component E 217. Component E 217 may comprise a second Web Service Layer of Application 1. Request parameters associated with Component E 217 may comprise, for example, webservice, webservice operation, host, port, account number, and/or other request parameters. Values associated with the respective request parameters may include, for example, AccountService, ChargeEmployeeAccount, MyNewWorld.com, 6666, 1234567, and/or other values. After access of component E 217, request module 120 may be configured to access component F 231 of Application 2 230. Component F 231 may comprise a Web Service Layer of Application 2 230. Request parameters associated with Component F 231 may comprise, for example, webservice, webservice operation, port, account number, url, thread name, and/or other request parameters. Values associated with the respective request parameters may include, for example, AccountService, ChargeEmployeeAccount, 6666, 1234567, http://MyNewWorld.com/AccountService/ChargeEmployeeAccount, WSListener1, and/or other values. After access of component F 231, request module 120 may be configured to access component G 232. Component G 232 may comprise Processing Logic of Application 2 230. Request parameters associated with Component G 232 may comprise, for example, account number, calling system, TransactionContext, ThreadName, and/or other request parameters. Values associated with the respective request parameters may include, for example, 1234567, ApplicationA, ChargeEmployeeAccount, Charging-43, and/or other values.

Returning to FIG. 1, the monitoring module 130 may be configured to store, at a log associated with the executed request, components associated with the execution of the request, request parameters associated with the respective components, values associated with the respective request parameters, metrics associated with the execution, and/or other information for a log for the executed request. In some implementations, the monitoring module 130 may pull information for the log from a call stack associated with execution of the request. In some implementations, monitoring module 130 may obtain the information for the log via an agent running on the system that collects the information. For example, the agent may be a java agent (e.g. that uses byte code instrumentation), a CLR profiler, and/or other agent that compiles information related to execution of the request.

In some implementations, the monitoring module 130 may be configured to store information in an associated log for each request executed via system 10. In some implementations, the monitoring module 130 may be configured to store information for a predetermined number of requests based on the occurrence of a trigger event. The trigger event may be, for example, one or more of: identification of an error in an executed request, a predetermined time period passing after storing information related to execution of a request, an introduction of a new device (e.g., device 30*n*) to system 10, introduction of a new application to system 10, introduction of a new component to system 10, and/or another trigger event.

The error identification module 140 may be configured to identify logs from the collection of logs, compare parameters of a log for the executed request with parameters of logs from the collection of logs. When information associated with a component of a log of the executed request does not match information associated with a corresponding component from the historical log, the error modification module 140 determine that a root cause for an error is associated with that component of the executed request.

In some implementations, the error identification module 140 may identify a set of logs from the collection of logs that relate to the same request as the executed request. The error identification module 140 may compare the information related to the executed request with information related to the requests associated with the stored logs. For example, the error identification module 140 may compare the information related to the executed request with information related to some or all of the logs stored in the collection of logs. When the entry point, components, and/or request parameters of the executed request match the entry point, components, and/or request parameters of a stored log, information associated with the components of the executed request and the stored log may be compared.

In some implementations, the error identification module 140 may identify a subset of logs related to requests that might match the executed request. The error identification module 140 may identify the subset of logs based on a similar entry point, a similar number of components, a similar number of accessed applications, a similar number of request parameters associated with the request, and/or based on other criteria relating to a request. The error identification module 140 may compare the subset of logs with the log associated with the executed request. When the entry point, components, and/or request parameters of the executed request match the entry point, components, and/or request parameters of one of the logs of the subset of logs, information associated with the components of the executed request and the log may be compared.

In some implementations, one or more of an entry point, components, request parameters, and/or other information related to a request may be compared to determine logs from the collection of logs (or a subset thereof) that match the log associated with the executed request. In some implementations, one or more of values associated with the request parameters of the components, average response time of the entire request, a plurality of response times associated with the respective plurality of components associated with the request, a time of day of request, and/or other information related to the log associated with a request may be compared.

In some implementations, when information associated with a component of the log associated with the executed request does not match information associated with respective components of logs stored in the collection of logs, the error identification module 140 may determine that an error occurred in the application. In some implementations, the error identification module 140 may determine that a root cause of the error that occurred was based on a component associated with the information that did not match. For example, when a value of a request parameter associated with a component of the executed request does not match a corresponding value of a stored log, the error identification module 140 may determine that a root cause for the error of the request is associated with that component. In another example, an error may be found when a number of components associated with the executed request does not match the number of components of the stored log, when an order of the components of the executed request does not match the order of components of the stored log, when a response time associated with a component of the executed request is outside of a threshold value associated with response time associated with a component of the stored log, when a time of day associated with the executed request is outside a threshold time of day associated with the stored log, and/or based on other differences between the executed request and the stored log.

In some implementations, when the error identification module 140 determines that a root cause for an error in an application and/or request is associated with a specific component of that request, the error identification module 140 may facilitate providing information related to the error and the root cause to a user of the system 10. For example, the error identification module 140 may facilitate providing the information via a user interface of computing device 100, devices 30*a*, . . . , 30*n*, and/or via other devices related to a user of the system 10. In another example, error identification module 140 may provide the information via electronic mail, text message, SMS, and/or other methods of electronic communication. In some implementations, reporting module 160 (described below) may provide information relating to the determination of the root cause of an error in the executed request.

The network module 150 may be configured to transmit and receive information between one or more devices of system 10 and/or external to system 10. For example, network module 150 may maintain one or more electronic communication links via which computing device 100, devices 30a, . . . , 30n, network 20, and/or external resources may be operatively linked. For example, such electronic communication links may be established, at least in part, via a network such as the Internet and/or other networks. It will be appreciated that this is not intended to be limiting, and that the scope of this disclosure includes implementations in which network module 150 may facilitate the operative linking of computing device 100, devices 30a, . . . , 30n, network 20, and/or external resources via some other communication media.

The reporting module 160 may be configured to facilitate analysis and report information related to system usage, requests, logs, request execution, error identification, and/or other information stored at storage 170. The reporting module 160 may be configured to produce statistics regarding the related information. The reporting module 160 may be configured to prepare and/or display reports including one or more parts of the related information and any statistics regarding that related information.

For example, the reporting module 160 may maintain and/or report information regarding errors identified during execution of requests. In another example, reporting module 160 may maintain and/or report information relating to threshold values associated with respective parameters of respective components of requests. Reporting module 160 may maintain and/or report information related to logs stored in the collection of logs. Reporting module 160 may maintain and/or report information related to access of a set of components during execution of a request. The types of information maintained and/or reported by reporting module 160 are not limited to the examples described herein.

In some implementations, reporting module 160 may facilitate a search for information related to requests, to logs, to components, to identified errors, and/or to other information stored via system 10. For example, the reporting module 160 may facilitate a search for related information based on one or more of: request identifier, entry point, component identifier, number of components, a sequential order of components, number of applications, identified error, time period (e.g., related information stored during a specific time period, related information stored within an immediately preceding time period, and/or other time periods), request parameters, values, and/or other information related to a request, a log, a component, and/or other information stored via system 10.

In some implementations, the reporting module 160 may generate reports based on the maintained information and/or statistics. For example, the reporting module 160 may generate reports at pre-determined time intervals, at an user's or administrator's request, and/or may make some or all of the information and/or statistics available via an interface of the computing device 100.

The computing device 100 may be any computing device such as, for example, a server, a desktop computer, laptop computer, personal digital assistant, smart phone, and/or any other computing device. Other configurations and system architectures may be used. For example, although not shown, computing device 100 may be or include one or more servers connected to one or more clients via a network 20 such as a Wide Area Network, Local Area Network, the Internet, a cloud-based network and/or other network or combination thereof. The computing device 100 may be capable of communicating with network 20, storage module 170 and one or more other devices, such as devices 30a, . . . , 30n.

Computing device 100 may include one or more processors 110 configured to execute computer program modules. The computer program modules may be configured to provide functionality attributed herein to computing device 100.

Storage module 170 may comprise electronic storage media that electronically stores information non-transiently. The electronic storage media of storage module 170 may include one or both of system storage that is provided integrally (i.e., substantially non-removable) with computing device 100 and/or removable storage that is removably connectable to computing device 100 via, for example, a port (e.g., a USB port, a firewire port, etc.) or a drive (e.g., a disk drive, etc.). Storage module 170 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Storage module 170 may include one or more virtual storage resources (e.g., cloud storage, a virtual private network, and/or other virtual storage resources). Storage module 170 may store software algorithms, information determined by processor 110, information received from computing device 100, information received from devices 30a, . . . , 30n, and/or other information that enables computing device 100 to function as described herein.

Processor(s) 110 may provide information processing capabilities within computing device 100. As such, processor 110 may include one or more of a digital processor, an analog processor, a digital circuit designed to process information, an analog circuit designed to process information, a state machine, and/or other mechanisms for electronically processing information. Although processor 110 is shown in FIG. 1 as a single entity, this is not intended to be limiting, as processor 110 may include a plurality of processors operating in coordination or cooperation. This may include implementations in which computing device 100 includes a multi-processor device, a farm of server devices operating together, and/or virtual resources provided by the cloud. The processor 110 may be configured to execute modules 120, 130, 140, 150, and/or 160. Processor 110 may be configured to execute modules 120, 130, 140, 150, and/or 160 by software; hardware; firmware; some combination of software, hardware, and/or firmware; and/or other mechanisms for configuring processing capabilities on processor 16.

It should be appreciated that although modules 120, 130, 140, 150, and/or 160 are illustrated in FIG. 1 as being co-located within a single processing unit, in implementations in which processor 110 includes multiple processing units, one or more of modules 120, 130, 140, 150, and/or 160 may be located remotely from the other modules. The description of the functionality provided by the different modules 120, 130, 140, 150, and/or 160 described below is for illustrative purposes, and is not intended to be limiting, as any of modules 120, 130, 140, 150, and/or 160 may provide more or less functionality than is described. For example, one or more of modules 120, 130, 140, 150, and/or 160 may be eliminated, and some or all of its functionality may be provided by other ones of modules 120, 130, 140, 150, and/or 160. As another example, processor 110 may be configured to execute one or more additional modules that may perform some or all of the functionality attributed below to one of modules 120, 130, 140, 150, and/or 160.

Devices 30a, . . . , 30n may be any computing device such as, for example, a server, a desktop computer, laptop computer, personal digital assistant, smart phone, and/or any other computing device. Other configurations and system architectures may be used. For example, although not shown, devices 30a, ..., 30n may be or include one or more servers connected to one or more other devices and/or to computing device 100 via a network 20 such as a Wide Area Network, Local Area Network, the Internet, a cloud-based network and/or other network or combination thereof. The devices 30a, ..., 30n may be capable of communicating with network 20, storage module 170 and one or more other devices, such as computing device 100. Devices 30a, ..., 30n may execute some or all components of a request. Applications executed via system 10 may be distributed across one or more of devices 30a, ..., 30n. The storage 170 may store information related to all available applications, components, and/or other information related to devices 30a, ..., 30n.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
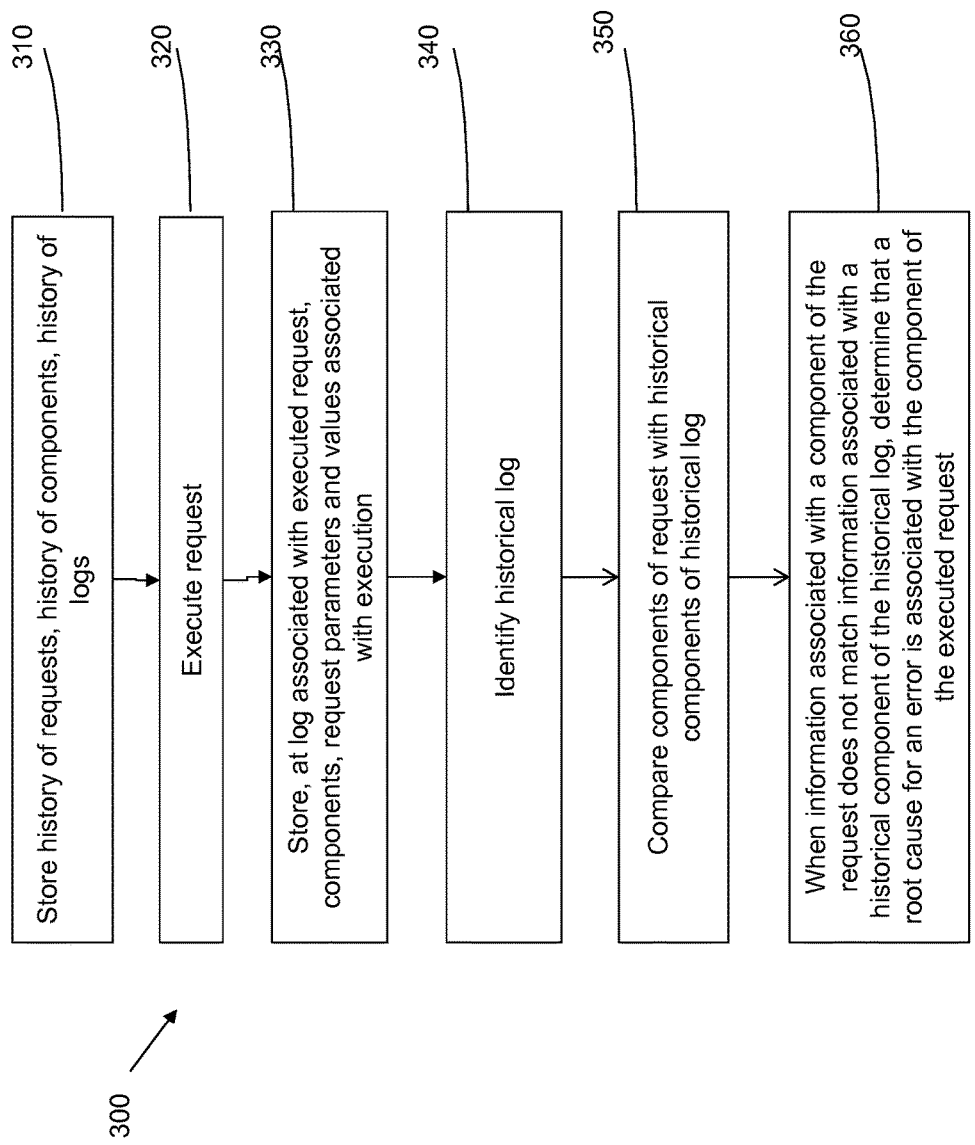
FIG. 3 illustrates a method for automatically detecting a root cause for an error that occurred in an application, according to various implementations.

FIG. 3 illustrates a method 300 of for automatically detecting a root cause for an error that occurred in an application. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 310, information related to a plurality of applications may be stored. The information may comprise, for example, a collection of requests, where the requests comprise at least a first request associated with a first application and a second request associated with a first application, a collection of components associated with the respective requests, a collection of logs associated with the respective requests, where a log comprises a component associated with a request, a request parameter associated with a component, and a value associated with the request parameter, and/or other information related to the plurality of applications. In some implementations, operation 310 may be performed by a storage module, monitoring module, and/or other modules the same as or similar to storage module 170, monitoring module 130, and/or other modules (shown in FIG. 1 and described above).

At an operation 320, the first request may be executed, where the first request may comprise at least an instruction and a request parameter. In some implementations, operation 320 may be performed by a request module the same as or similar to request module 120 (shown in FIG. 1 and described above).

At an operation 330, a parameter associated with the execution of the first request and a value associated with the request parameter may be stored at a first log associated with the first request. In some implementations, operation 330 may be performed by a monitoring module the same as or similar to monitoring module 130 (shown in FIG. 1 and described above).

At an operation 340, a log may be identified from the collection of logs. In some implementations, operation 340 may be performed by an error identification module the same as or similar to error identification module 140 (shown in FIG. 1 and described above).

At an operation 350, a first parameter of the first log may be compared with a parameter of the identified log. In some implementations, operation 350 may be performed by an error identification module the same as or similar to error identification module 140 (shown in FIG. 1 and described above).

At an operation 360, when information associated with the first parameter of the first log does not match information associated with the parameter of the identified log, a root cause for an error may be determined to be associated with the first parameter of the first request. In some implementations, operation 360 may be performed by an error identification module the same as or similar to error identification module 140 (shown in FIG. 1 and described above).

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific aspects and implementations of the technology, and performing certain actions. However, it will be apparent that such descriptions are merely for convenience, and that such actions may in fact result from computing devices, processors, controllers, or other devices executing firmware, software, routines or instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method being implemented on a computer system comprising a physical processor, the method comprising:
monitoring execution of a first request involving an application;
storing a log associated with the first request, the log associated with the first request comprising information associated with a first parameter associated with a first component of the first request, a first value associated with the first parameter, information associated with a second parameter associated with a second component of the first request, and a second value associated with the second parameter, wherein the first component of the first request is associated with the application and the second component of the first request is associated with another application;

identifying a subset of one or more logs from a collection of logs as an identified log by comparing a plurality of attributes of the first request to a corresponding plurality of attributes of the log, each log of the collection of logs having information associated with a component of another request;

responsive to identification of the identified log, comparing information associated with a first component of the first request with information associated with a component of the identified log, wherein the information associated with the first component of the first request comprises an input parameter processed by the first component, a response time associated with the first component, a time of day associated with the first component, and/or a position of the first component in the order of the components of the first request; and responsive to a determination that the information associated with the first component of the first request does not match information associated with the component of the identified log, determining that a root cause of an error that occurred in the application is associated with the first component of the first request.

2. The method of claim 1, wherein the first request comprises a transaction, an application call, a command to execute a program, or a system call.

3. The method of claim 1, further comprising storing, at the log associated with the first request, information associated with an entry point of the first request.

4. The method of claim 1, wherein identifying the identified log comprises identifying a plurality of logs of the collection of logs associated with requests similar to the first request as a plurality of identified logs.

5. The method of claim 4, wherein identifying the plurality of identified logs comprises identifying an individual log in the collection of logs wherein an attribute of the plurality of attributes of the individual log and the first request are similar, wherein the attributes comprise one or more selected from: an entry point, a number of components, a scheduled order of components, or a number of applications accessed.

6. The method of claim 4, further comprising:
comparing a first value associated with a first parameter of the first component of the first request with respective values associated with respective parameters of respective components of the plurality of identified logs;
responsive to a determination that the first value of the first request does not match a respective value of an individual log of the plurality of identified logs, determining that the root cause for the error is associated with the first component of the first request.

7. The method of claim 4, further comprising:
comparing a first value associated with a first parameter of the first component of the first request with respective values associated with respective parameters of respective components of the plurality of identified logs;
responsive to a determination that the first value of the first request is outside a threshold value associated with the respective parameters of the plurality of identified logs, determining that the root cause for the error is associated with the first component of the first request.

8. The method of claim 1, further comprising providing information related to the root cause responsive to the determination of the root cause for the error.

9. A system comprising:
a physical processing device;
a computer-readable storage medium comprising instructions that, when executed using the physical processing device, are configured to put into effect a plurality of modules including:
a monitoring module configured to monitor execution of a first request involving an application and configured to store a log associated with the first request, the log associated with the first request comprising information associated with a first parameter associated with a first component of the first request, a first value associated with the first parameter, information associated with a second parameter associated with a second component of the first request, and a second value associated with the second parameter, wherein the first component of the first request is associated with the application and the second component of the first request is associated with another application; and
an error identification module configured to:
identify a subset of one or more logs from a collection of logs as an identified log by comparing a plurality of attributes of the first request to a corresponding plurality of attributes of the logs, each log of the collection of logs having information associated with a component of another request;
responsive to identification of the identified log, compare information associated with a first component of the first request with information associated with a component of the identified log, wherein the information associated with the first component of the first request comprises an input parameter processed by the first component, a response time associated with the first component, a time of day associated with the first component, and/or a position of the first component in the order of the components of the first request; and
responsive to a determination that the information associated with the first component of the first request does not match information associated with the component of the identified log, determine that a root cause of an error that occurred in the application is associated with the first component of the first request.

10. The system of claim 9, wherein the first request comprises a transaction, an application call, a command to execute a program, or a system call.

11. The system of claim 9, wherein the monitoring module is further configured to store, at the log associated with the first request, information associated with an entry point of the first request.

12. The system of claim 9, wherein the error identification module is configured to identify the identified log by identifying a plurality of logs of the collection of logs associated with requests similar to the first request as a plurality of identified logs.

13. The system of claim 12, wherein the error identification module is configured to identify the plurality of identified logs by identifying an individual log in the collection of logs wherein an attribute of the plurality of attributes of the individual log and the first request are similar, wherein the attribute comprise one or more selected from: an entry point, a number of components, a scheduled order of components accessed, or a number of applications accessed.

14. The system of claim 12, wherein the error identification module is further configured to:
compare a first value associated with a first parameter of the first component of the first request with respective values associated with respective parameters of respective components of the plurality of identified logs; and
responsive to a determination that the first value of the first request does not match a respective value of an individual log of the plurality of identified logs, determine that the root cause for the error is associated with the first component of the first request.

15. The system of claim 12, wherein the error identification module is further configured to:
compare a first value associated with a first parameter of the first component of the first request with respective values associated with respective parameters of respective components of the plurality of identified logs; and
responsive to a determination that the first value of the first request is outside a threshold value associated with the respective parameters of the plurality of identified logs, determine that the root cause for the error is associated with the first component of the first request.

16. The system of claim 9, wherein the error identification module is further configured to provide information related to the root cause responsive to the determination of the root cause for the error.

17. A computer program product comprising:
a non-transitory computer readable storage medium storing information, the stored information comprising:
instructions configured to cause a computing device to:
monitor execution of a first request involving an application;
store a log associated with the first request, the log associated with the first request comprising information associated with a first parameter associated with a first component of the first request, a first value associated with the first parameter, information associated with a second parameter associated with a second component of the first request, and a second value associated with the second parameter, wherein the first component of the first request is associated with the application and the second component of the first request is associated with another application;
identify a subset of one or more logs from a collection of logs as an identified log by comparing a plurality of attributes of the first request to a corresponding plurality of attributes of the logs, each log of the collection of logs having information associated with a component of another request;
responsive to identification of the identified log, compare information associated with a first component of the first request with information associated with a component of the identified log, wherein the information associated with the first component of the first request comprises an input parameter processed by the first component, a response time associated with the first component, a time of day associated with the first component, and/or a position of the first component in the order of the components of the first request; and
responsive to a determination that the information associated with the first component of the first request does not match information associated with the component of the identified log, determine that a root cause of an error that occurred in the application is associated with the first component of the first request.

18. The computer program product of claim 17, wherein the first request comprises a transaction, an application call, a command to execute a program, or a system call.

19. The computer program product of claim 17, wherein the instructions are further configured to cause the computing device to store, at the first log, information associated with an entry point of the first request.

20. The computer program product of claim 17, wherein the instructions are configured to cause the computing device to identify the identified log by identifying a plurality of logs of the collection of logs associated with requests similar to the first request as a plurality of identified logs.

21. The computer program product of claim 20, wherein the error identification module is configured to identify the plurality of identified logs by identifying an individual log in the collection of logs wherein an attribute of the plurality of attributes of the individual log and the first request are similar, wherein the attribute comprise one or more selected from: an entry point, a number of components, a scheduled order of components accessed, or a number of applications accessed.

22. The computer program product of claim 20, wherein the instructions are further configured to cause the computing device to:
compare a first value associated with a first parameter of the first component of the first request with respective values associated with respective parameters of respective components of the plurality of identified logs;
responsive to a determination that the first value of the first request does not match a respective value of an individual log of the plurality of identified logs, determine that the root cause for the error is associated with the first component of the first request.

23. The computer program product of claim 20, wherein the instructions are configured to cause the computing device to:
compare a first value associated with a first parameter of the first component of the first request with respective values associated with respective parameters of respective components of the plurality of identified logs;
responsive to a determination that the first value of the first request is outside a threshold value associated with the respective parameters of the plurality of identified logs, determine that the root cause for the error is associated with the first component of the first request.

24. The computer program product of claim 17, wherein the instructions are further configured to cause the computing device to provide information related to the root cause responsive to the determination of the root cause for the error.

* * * * *